(12) United States Patent  (10) Patent No.: US 8,246,411 B2
Wang et al.  (45) Date of Patent: Aug. 21, 2012

(54) MANUFACTURING METHOD FOR FLEXIBLE DISPLAY APPARATUS

(75) Inventors: Tzu-Ming Wang, Hsinchu (TW);
Kai-Cheng Chuang, Hsinchu (TW);
Po-Wen Hsiao, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 311 days.

(21) Appl. No.: 12/699,036

(22) Filed: Feb. 2, 2010

(65) Prior Publication Data

US 2011/0104973 A1 May 5, 2011

(30) Foreign Application Priority Data

Nov. 5, 2009 (TW) ................................ 98137643 A

(51) Int. Cl.
*H01J 9/26* (2006.01)
(52) U.S. Cl. .......................................... 445/25; 313/512
(58) Field of Classification Search .................. 313/512; 445/24, 25
See application file for complete search history.

(56) References Cited

U.S. PATENT DOCUMENTS

| 6,724,458 | B2 * | 4/2004 | Kim et al. | 349/156 |
|---|---|---|---|---|
| 6,738,124 | B2 * | 5/2004 | Park et al. | 349/153 |
| 6,793,756 | B2 * | 9/2004 | Lee et al. | 156/228 |
| 6,827,623 | B2 * | 12/2004 | Nakatake et al. | 445/25 |
| 7,477,015 | B2 * | 1/2009 | Nakamura | 313/512 |
| 8,083,563 | B2 * | 12/2011 | Liu et al. | 445/25 |
| 2003/0073372 | A1 * | 4/2003 | Nakatake et al. | 445/25 |
| 2004/0201027 | A1 * | 10/2004 | Ghosh | 257/99 |
| 2005/0242341 | A1 * | 11/2005 | Knudson et al. | 257/40 |
| 2008/0220684 | A1 * | 9/2008 | Nakane et al. | 445/25 |
| 2009/0128030 | A1 * | 5/2009 | Kai et al. | 313/512 |

FOREIGN PATENT DOCUMENTS

| CN | 101877319 A | 11/2010 |
|---|---|---|
| JP | 04-060513 A | 2/1992 |

OTHER PUBLICATIONS

China Official Action Issued on Feb. 13, 2012.

* cited by examiner

*Primary Examiner* — Nimeshkumar Patel
*Assistant Examiner* — Mary Ellen Bowman
(74) *Attorney, Agent, or Firm* — Chun-Ming Shih

(57) ABSTRACT

A manufacturing method for flexible display apparatus includes following steps. A carrier frame is formed on a rigid substrate. A flexible substrate is formed on the carrier substrate, wherein a border of the flexible substrate is supported by the carrier frame. A display unit is formed on the flexible substrate. At least a portion of the flexible substrate is separated from the carrier frame. In the manufacturing method, the flexible substrate and the carrier frame can be easily separated.

8 Claims, 3 Drawing Sheets

MANUFACTURING METHOD FOR FLEXIBLE DISPLAY APPARATUS

CROSS-REFERENCE TO RELATED APPLICATIONS

This application is based upon and claims the benefit of priority from the prior Taiwanese Patent Application No. 098137643, filed Nov. 5, 2009, the entire contents of which are incorporated herein by reference.

BACKGROUND

1. Field of the Invention

The present invention relates to a flexible display apparatus, and particularly to a manufacturing method for flexible display apparatus.

2. Description of the Related Art

With the progress of the flat display technique, more and more electronic products, especially portable electrical products such as mobile phones, e-book apparatuses, digital cameras, personal digital assistants, etc., are respectively equipped with a display apparatus. The development trend of the portable electrical product is achieving light weight and thin thickness, so the display apparatus for the portable electrical product should have features of light weight and thin thickness.

The flexible display apparatus, such as the flexible electrophoretic display (EPD) apparatus or the flexible liquid crystal display (LCD) apparatus etc., not only has features of light weight and thin thickness, but also has features of flexibility and hard to be broken. Therefore, the development of the flexible display apparatus has become increasingly important.

The flexible display apparatus is manufactured by forming a driving circuit layer and a display layer on a flexible substrate. In order to continue using the manufacturing process of the non-flexible display apparatus to manufacture the flexible display apparatus, the flexible substrate should be formed on a rigid substrate when manufacturing the flexible display apparatus. Then, the driving circuit layer and the display layer are manufactured on the flexible substrate. Afterward, the flexible substrate and the rigid substrate are separated from each other.

Therefore, it is important to develop a manufacturing method for flexible display apparatus to let the flexible substrate and the rigid substrate can be easily separated.

BRIEF SUMMARY

The present invention provides a manufacturing method for flexible display apparatus to let a flexible substrate and a rigid substrate can be easily separated.

To achieve the above-mentioned advantages, the present invention provides a manufacturing method for flexible display apparatus including following steps. A carrier frame is formed on a rigid substrate. A flexible substrate is formed on the carrier frame, wherein a border of the flexible substrate is supported by the carrier frame. Then, a display unit is formed on the flexible substrate. Afterward, a portion of the flexible substrate is separated from the carrier frame.

In an embodiment of the present invention, the manufacturing method further includes forming a sealant layer at the rigid substrate along a border of the carrier frame before forming the display unit, and the border of the flexible substrate is covered by the sealant layer.

In an embodiment of the present invention, the method for forming the carrier frame includes spreading glue or sticking adhesive tape.

In an embodiment of the present invention, the method for forming the flexible substrate includes sticking a supporting layer on the carrier frame and then spreading a substrate layer on the supporting layer.

In an embodiment of the present invention, material of the supporting layer and the substrate layer are respectively selected from one of polyethylene terephthalate (PET), polyimide (PI), poly(ethylene-2,-6 naphthalate) (PEN), polymethylmethacrylate (PMMA), stainless steel and metal alloy.

In an embodiment of the present invention, the method for forming the display unit includes forming a driving circuit layer on the flexible substrate, and then forming a display layer on the driving circuit layer.

In an embodiment of the present invention, the display unit has a display part and a cutting part surrounding the display part. A border between the display part and the cutting part is located at an inner side of the carrier frame. The method for separating the portion of the flexible substrate from the carrier frame includes cutting the cutting part and a portion of the flexible substrate under the cutting part along the border between the display part and the cutting part.

In an embodiment of the present invention, the method for separating the portion of the flexible substrate from the carrier frame further includes cutting a portion of the rigid substrate under the cutting part while cutting the cutting part and the portion of the flexible substrate under the cutting part.

In an embodiment of the present invention, material of the carrier frame is adhesive material.

In the manufacturing method for forming flexible display apparatus of the present invention, the flexible substrate needs not be adhered on the rigid substrate due to forming the flexible substrate on the carrier frame. Therefore, the flexible substrate and the rigid substrate can be easily separated.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1A:
FIGS. 1A to 1E are flow charts of a manufacturing method for flexible display apparatus according to an embodiment of the present invention.
Figure 1B:
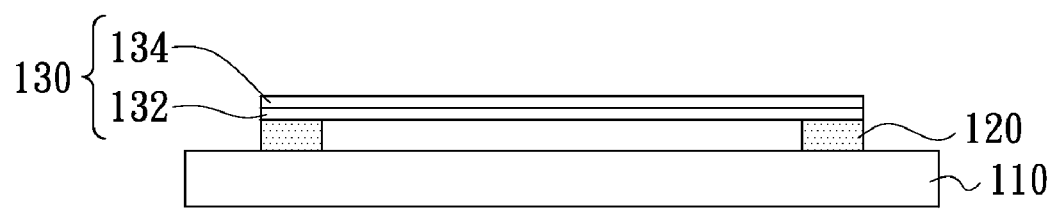
Figure 1C:
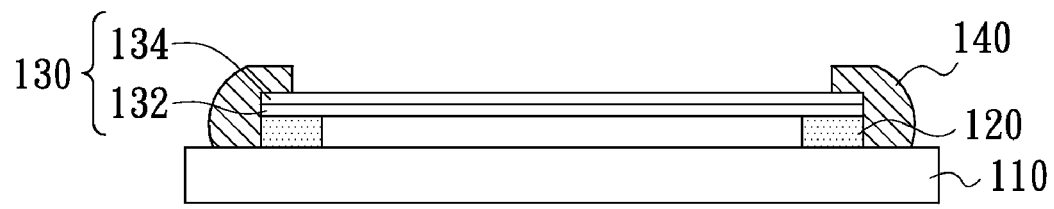
Figure 1D:
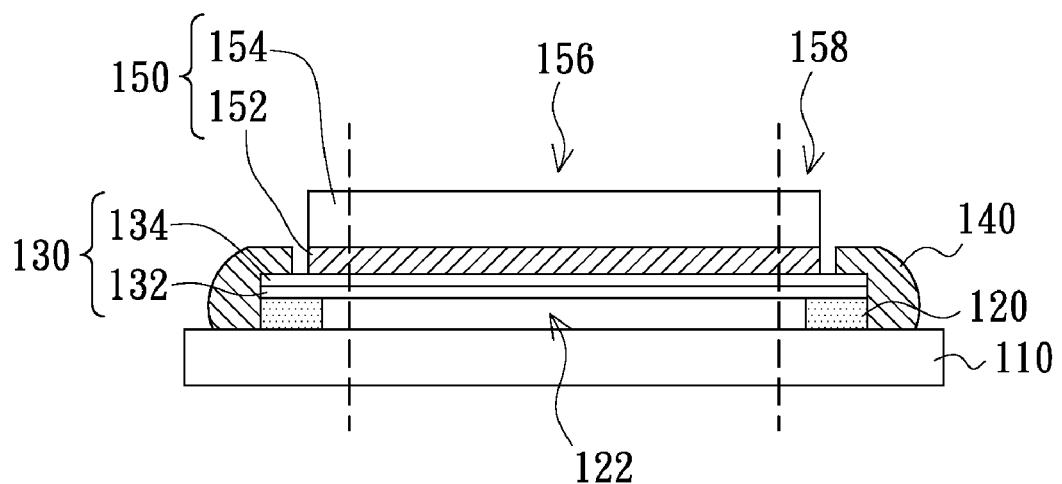
Figure 1E:
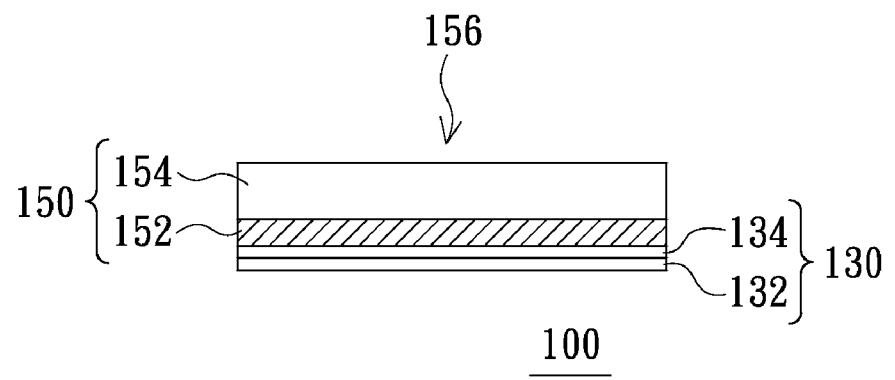
Figure 2:
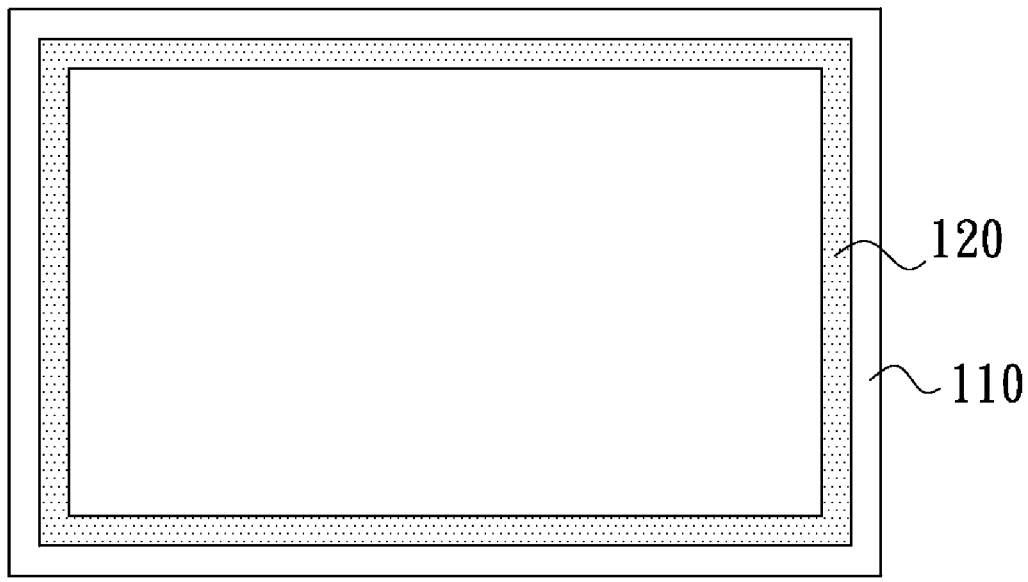
FIG. 2 is a schematic top view of FIG. 1A.

FIGS. 1A to 1E are flow charts of a manufacturing method for flexible display apparatus according to an embodiment of the present invention, and FIG. 2 is a schematic top view of FIG. 1A. Referring to FIGS. 1A and 2, the manufacturing method for flexible display apparatus of the present embodiment includes following steps. A carrier frame 120 is formed on a rigid substrate 110. The rigid substrate 110 can be, but not limited to, a glass substrate. Material of the carrier frame 120 can be adhesive material. The method for forming the carrier frame 120 includes, for example, spreading glue or sticking adhesive tape.

Then, referring to FIG. 1B, a flexible substrate 130 is formed on the carrier frame 120, wherein a border of the flexible substrate 130 is supported by the carrier frame 120. More specifically, the method for forming the flexible substrate 130 includes sticking a supporting layer 132 on the carrier frame 130, and then spreading a substrate layer 134 on the supporting layer 132. A border of the supporting layer 132 is adhered at the carrier frame 120. Moreover, material of the supporting layer 132 includes, but not limited to, PET, and material of the substrate layer 134 includes, but not limited to, PI. The material of the supporting layer 132 and the substrate layer 134 also can be plastic or metal. More specifically, the material of the supporting layer 132 and the substrate layer 134 can be respectively selected from one of PET, PI, PEN, PMMA, stainless steel and metal alloy. Furthermore, the flexible substrate 130 of the present embodiment is not limited to include two layers (i.e. the supporting layer 132 and the substrate layer 134). In other embodiments, the flexible substrate 130 can include single layer or multiple layers.

Afterward, referring to FIG. 1C, to further fix a location of the flexible substrate 130 and to prevent the flexible substrate 130 from deformation in following processes, a sealant layer 140 can be formed at the rigid substrate 110 along a border of the carrier frame 120, wherein the border of the flexible substrate 130 is covered by the sealant layer 140. It should be noted that the step for forming the sealant layer 140 is an optional step.

Then, referring to FIG. 1D, a display unit 150 is formed on the flexible substrate 130. In the present embodiment, the method for forming the display unit 150 includes, for example, forming a driving circuit layer 152 on the flexible substrate 130, and then forming a display layer 154 on the driving circuit layer 152. The display layer 154 can be a liquid crystal display layer, an electrophoretic display layer or other suitable display layer.

Afterward, a portion of the flexible substrate 130 is separated from the carrier frame 120 to acquire a flexible display apparatus 100 as shown in FIG. 1E. More specifically, the display unit 150 of the present embodiment, for example, has a display part 156 and a cutting part 158 surrounding the display part 156. A border (shown as a dotted line in FIG. 1D) between the display part 156 and cutting part 158 is located at an inner side 122 of the carrier frame 120. The display part 158 includes a display area and a peripheral circuit area. The cutting part 158 is a superfluous part that should be cut. The method for separating the portion of the flexible substrate 130 from the carrier frame 120 includes cutting the cutting part 158 and a portion of the flexible substrate 130 under the cutting part 158 along the border between the display part 156 and the cutting part 158 to separate the portion of the flexible substrate 130 under the display part 156 from the carrier frame 120, and then the flexible display apparatus 100 is acquired. Further, a portion of the rigid substrate 110 under the cutting part 158 also can be cut while the cutting part 158 and the portion of the flexible substrate 130 under the cutting part 158 being cut.

In the manufacturing method for forming flexible display apparatus of the present embodiment, the flexible substrate 130 is formed on the carrier frame 120, so the flexible substrate 130 needs not be adhered on the rigid substrate 110. Therefore, the flexible substrate 130 and the rigid substrate 110 can be easily separated.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A manufacturing method for flexible display apparatus comprising:
    forming a carrier frame on a rigid substrate;
    forming a flexible substrate on the carrier frame and a border of the flexible substrate being supported by the carrier frame;
    forming a display unit on the flexible substrate; and
    separating a portion of the flexible substrate from the carrier frame,
    wherein the display unit has a display part and a cutting part surrounding the display part, a border between the display part and the cutting part is located at an inner side of the carrier frame, and the method for separating the portion of the flexible substrate from the carrier frame comprises:
    cutting the cutting part and a portion of the flexible substrate under the cutting part along the border between the display part and the cutting part.

2. The manufacturing method as claimed in claim 1, wherein before forming the display unit, the manufacturing method further comprises forming a sealant layer at the rigid substrate along a border of the carrier frame, and the border of the flexible substrate is covered by the sealant layer.

3. The manufacturing method as claimed in claim 1, wherein the method for forming the carrier frame includes spreading glue or sticking adhesive tape.

4. The manufacturing method as claimed in claim 1, wherein the method for forming the flexible substrate comprises:
    sticking a supporting layer on the carrier frame; and
    spreading a substrate layer on the supporting layer.

5. The manufacturing method as claimed in claim 4, wherein material of the supporting layer and the substrate layer are respectively selected from one of polyethylene terephthalate, polyimide, poly(ethylene-2,-6 naphthalate), polymethylmethacrylate, stainless steel and metal alloy.

6. The manufacturing method as claimed in claim 1, wherein the method for forming the display unit comprises:
    forming a driving circuit layer on the flexible substrate; and
    forming a display layer on the driving circuit layer.

7. The manufacturing method as claimed in claim 1, wherein the method for separating the portion of the flexible substrate from the carrier frame further comprises:
    cutting a portion of the rigid substrate under the cutting part while cutting the cutting part and the portion of the flexible substrate under the cutting part.

8. The manufacturing method as claimed in claim 1, wherein material of the carrier frame is adhesive material.

* * * * *